United States Patent
Hitomi et al.

(10) Patent No.: US 7,589,495 B2
(45) Date of Patent: Sep. 15, 2009

(54) BATTERY PACK WITH SWITCHING DEVICE

(75) Inventors: Kazuhiro Hitomi, Sumoto (JP); Masao Yamaguchi, Sumoto (JP)

(73) Assignee: Sanyo Electric Co., Ltd., Osaka (JP)

( * ) Notice: Subject to any disclaimer, the term of this patent is extended or adjusted under 35 U.S.C. 154(b) by 42 days.

(21) Appl. No.: 11/480,356

(22) Filed: Jul. 5, 2006

(65) Prior Publication Data

US 2007/0013341 A1    Jan. 18, 2007

(30) Foreign Application Priority Data

Jul. 12, 2005    (JP)    ............... 2005-203163

(51) Int. Cl.
*H02J 7/00* (2006.01)
(52) U.S. Cl. .................. 320/112; 320/150; 324/431
(58) Field of Classification Search .............. 320/154, 320/112, 144, 150; 324/426, 431
See application file for complete search history.

(56) References Cited

U.S. PATENT DOCUMENTS

| | | | |
|---|---|---|---|
| 3,928,792 A * | 12/1975 | Mullersman et al. ........ 320/154 |
| 5,572,110 A * | 11/1996 | Dunstan ..................... 320/106 |
| 5,602,460 A * | 2/1997 | Fernandez et al. .......... 320/152 |
| 5,731,686 A * | 3/1998 | Malhi ......................... 320/154 |
| 5,900,719 A * | 5/1999 | Iimura ........................ 320/154 |
| 6,346,796 B1 * | 2/2002 | Takeda ........................ 320/154 |
| 2005/0151657 A1 * | 7/2005 | Lockhart et al. .......... 340/636.1 |
| 2005/0231205 A1 * | 10/2005 | Bertness et al. ............. 324/426 |

* cited by examiner

*Primary Examiner*—Edward Tso
*Assistant Examiner*—Arun Williams
(74) *Attorney, Agent, or Firm*—Wenderoth, Lind & Ponack, L.L.P.

(57) ABSTRACT

The battery pack is provided with communication lines that connect with attached electrical equipment, a temperature-sensing element that connects with a communication line, a switching device that connects with the temperature-sensing element, and a control section to control the switching device. The control section puts the switching device in the open state when the communication lines are being used and puts the switching device in the closed state when the communication lines are not being used to output temperature-sensing element voltage to the electrical equipment-side via the communication lines.

15 Claims, 1 Drawing Sheet

BATTERY PACK WITH SWITCHING DEVICE

BACKGROUND OF THE INVENTION

1. Field of the Invention

The present invention relates to a battery pack.

2. Description of the Related Art

In a known battery pack, a temperature-sensing element, which was a thermistor, was housed in the battery pack, and battery pack temperature measurement and various control functions were performed on the electrical equipment-side (electrical/electronic equipment such as electric tools, battery chargers, and notebook personal computers) via a battery pack connection terminal, which was a temperature terminal.

Meanwhile, a battery pack provided with a microprocessor unit as a controller has the capability of communicating with the electrical equipment-side to perform functions such as computation and display of remaining battery capacity and battery pack identification (ID) to verify whether or not the battery pack is an authentic specified battery pack (Japanese Patent Application Disclosure 2005-93109).

SUMMARY OF THE INVENTION

In the known battery packs, it was necessary to provide separate terminals for monitoring battery pack temperature and for communication with the electrical equipment-side. A temperature terminal for the battery temperature monitoring function and communication terminals for the communication function were required in connection terminals between the battery pack and electrical equipment. Since temperature terminal voltage varied with battery pack temperature variation, the temperature terminal could not be shared with communication terminals. Accordingly, to realize battery pack temperature monitoring and communication functions, separate terminals were necessary, the number of terminals had to increase, and overall cost-increase resulted. In applications demanding battery pack and electrical equipment miniaturization, cases occurred where terminals for both functions could not be implemented because of space requirements.

The present invention was developed to solve these types of problems, thus it is an object of the present invention to provide a battery pack that can share communication and temperature terminals.

The battery pack of the present invention is charged by electrical equipment or discharges to applicable electrical equipment, and in addition, conducts communication with that electrical equipment. The battery pack is provided with a temperature-sensing element connected to an internal communication line, a switching device that opens and closes connection of that temperature-sensing element with a reference voltage line, and a control section that controls the switching device and communication from the communication lines. The control section is characterized by putting the switching device in the open state when the communication lines are being used, and putting the switching device in the closed state when the communication lines are not being used. This outputs the voltage across the temperature-sensing element to the electrical equipment-side via a communication line when the communication lines are not being used (for battery pack-electrical equipment communication).

When the communication lines are being used in the battery pack described above, with the switching device in the open state, there is no effect from temperature-sensing element voltage variation on the communication lines, and therefore, the communication lines are usable. Alternatively, when the communication lines are not being used, with the switching device in the closed state, temperature-sensing element voltage can be measured on the electrical equipment-side via the communication lines. The above and further objects and features of the invention will more fully be apparent from the following detailed description with accompanying drawings.

DETAILED DESCRIPTION OF THE PREFERRED EMBODIMENT

Figure 1:
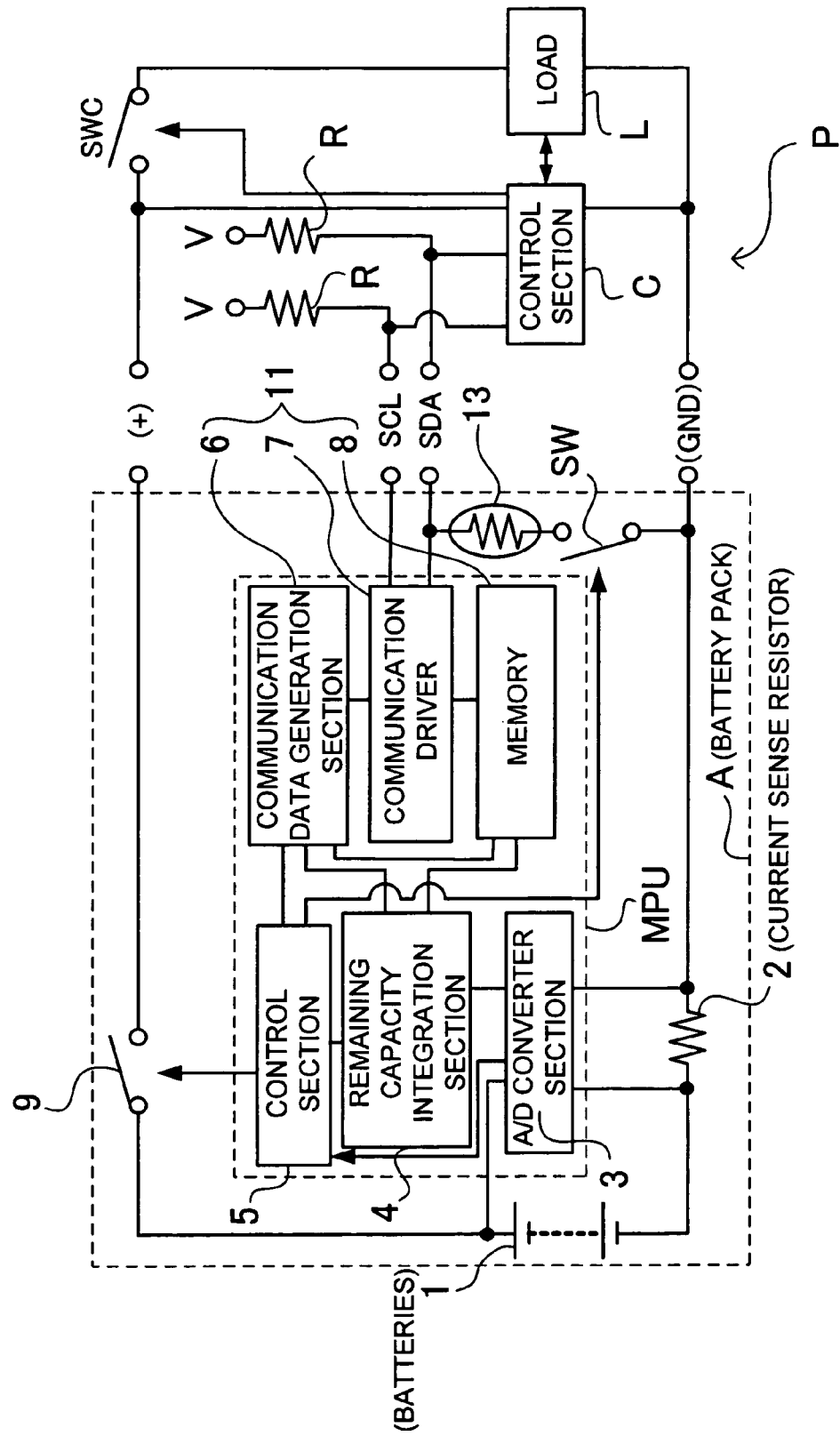
FIG. 1 is a block diagram of a battery pack of the present invention.

Embodiments of the present invention are described in detail with reference to the drawing. As shown in FIG. 1, the battery pack A of the present embodiment is provided with rechargeable batteries 1 such as lithium ion rechargeable batteries, a current sense resistor 2 (equivalent to a current detection section) to detect current during battery charging and discharging, and a microprocessor unit (MPU) that is a control circuit for performing tasks such as monitoring and controlling battery charging and discharging. When the battery pack A is attached to electrical equipment P, such as a battery charger, personal computer (PC), or electric tool, battery output is supplied to the electrical equipment P through the positive (+) terminal and ground (GND) terminal, and communication with the electrical equipment P is conducted via communication line terminals SCL, SDA. The electrical equipment P is provided with terminals that correspond to, and contact each of the battery pack terminals when the battery pack A is attached to the electrical equipment P.

The electrical equipment P is provided with a load L, and a control section C to control operations such as battery pack charging or discharging and to communicate with the battery pack A. In addition, the control section C controls the load L. The control section C controls a switching device SWC provided in the power supply line to control operations such as charging and discharging. For example, when information indicating full-charge of the batteries 1 is obtained by communication with the battery pack A, the control section C puts the switching device SWC in the off state to suspend charging.

The control section C is capable of functioning to send and receive data signals via the two communication lines, which are the data line and the dock line. A power supply section (not illustrated) within the control section C supplies power V (5V) through resistors R connected at the termination nodes of those communication lines. As described later, when the communication lines are not being used (for battery pack-electrical equipment communication), the control section 5 of the battery pack A puts the switching device SW in the closed state, and the voltage across the temperature detection section 13 can be measured by the control section C of the electrical equipment P. The control section C of the electrical equipment P can thereby attain the temperature of the batteries 1 in the battery pack A and can control charging and discharging based on that temperature. Charging and discharging can be suspended at set specified temperatures, and during battery charging, charging can be suspended at full charge when temperature rise exceeds a set value.

On the battery pack-side, the MPU is provided with an A/D converter section 3 to convert analog battery voltage and analog voltage across the current sense resistor 2 to digital format and to actual voltage [mV] and actual current [mA] values, a remaining capacity integration section 4 to integrate charging and discharging current and compute remaining battery capacity, and a control section 5 to detect battery 1 full charge and to control charging and discharging when abnormal current, temperature, or voltage is detected. A control device 9, such as a switching transistor, is controlled on and off, and it cuts-off current via a control signal from the control section 5 when abnormal current, temperature, or voltage is detected. In short, the control device 9 sets the state of current supply or cut-off.

The remaining capacity integration section 4 multiplies charging and discharging current converted by the A/D converter section 3 times the measurement sampling-time period (for example, 250 msec), and integrates those resulting values. During discharging, integrated values are subtracted from full charge, and during charging, integrated values are added to the remaining capacity at the start of charging. By these types of computations, the remaining capacity of the batteries 1 is determined.

The control section 5 detects full charge from battery voltage and charging current converted by the A/D converter section 3, and outputs full charge information indicating remaining capacity at 100%. (For current or voltage restrained by constant current charging or constant voltage charging, full charge is determined by voltage above a set value or by current below a set value respectively.) Full charge information can also be sent to the electrical equipment P via the communication lines.

Processing for communication with the electrical equipment P, such as a PC (personal computer) or battery charger, is conducted in the communication section 11 as described below. The communication section 11 is provided with a communication data generation section 6 to construct data signals that can be received by the electrical equipment P and contain various battery information such as battery voltage, remaining capacity, and charging and discharging current values; a communication driver section 7 to execute actual communication with the electrical equipment P, such as a PC or battery charger; and memory 8 to store various parameters for computing remaining capacity and to store various data. The communication driver section 7 receives requests from the electrical equipment P for transmission of various battery pack information, and data signals generated by the communication data generation section 6 are sent to the electrical equipment P from the communication driver section 7. In addition, a temperature detection section 13 including a thermistor as the temperature-sensing element is provided to measure battery temperature within the battery pack A. Although not shown in FIG. 1, the batteries 1 and the temperature detection section 13 are disposed in close contact so as to allow a thermal connection.

The upper terminal-side of the temperature detection section 13 is connected to the data line SDA of the communication lines, and the lower terminal-side is connected to the switching device SW. The lower terminal-side of the switching device SW is connected to the GND line, which is the reference voltage line. The switching device SW is controlled open or closed by the control section 5 of the MPU.

When the communication lines are being used (for battery pack-electrical equipment communication), the switching device SW is put in the open state, and when the communication lines are not being used, the switching device SW is put in the dosed state. With the switching device SW in the open state when the communication lines are being used, one end of the temperature detection section 13 is disconnected (floating), voltage across the temperature detection section 13 does not vary (since there is no reference potential), and voltage at the upper terminal-side of the temperature detection section 13 does not vary. Consequently, communication on the communication lines is not affected by the temperature detection section 13, and the communication lines can function normally.

In the embodiments of the present invention, the battery pack A is connected to electrical equipment P and charging or discharging proceeds by the steps described below. When the battery pack A is connected to the electrical equipment P, power from the battery pack A is applied to activate the control section C (or power converted from a commercial power source is applied to activate the control section C in the case where the electrical equipment P is a battery charger). Power V is supplied to communication line termination nodes by the power supply section inside the control section C.

In the first embodiment of the present invention, the control section C sends a signal to the battery pack A via the communication lines requesting battery pack ID information that indicates whether or not the battery pack A is an authentic specified product (for example, information indicating the manufacturer). Response to this request is from the control section 5 and communication section 11 in the battery pack A. Also, ID related information stored in memory 8 is read-out and sent to the electrical equipment P. This ID information is verified in the control section C of the electrical equipment P. When the information verifies an authentic specified battery pack, the switching device SWC is dosed to begin charging or discharging. When the battery pack A is judged not to be an authentic specified battery pack, the control section C puts the switching device SWC in the open state to stop charging or discharging. This type of communication can be implemented using well-known interface technology such as the SMBus. Here, if the communication lines are used only to judge ID information as described above, the communication lines will no longer be used once the battery pack A is attached and ID judgment is finished. For example, after the control section 5 sends ID related information to the electrical equipment-side, the switching device SW can be changed from the open state to the dosed state. This outputs the voltage across the temperature detection section 13, which includes the thermistor, to the control section C of the electrical equipment P via the data line, which is a communication line.

In the second embodiment of the present invention, the electrical equipment P periodically sends request signals from the control section C via the communication lines to acquire specific battery pack information (for example, voltage, current, etc. during charging and discharging). Namely, the battery pack A receives request signals from the electrical equipment P. In response to a request signal, the corresponding information is obtained from the control section 5 and sent to the electrical equipment-side from the control section 5 and communication section 11. In this manner, an information request signal is periodically sent from the electrical equipment P to the battery pack A, and the battery pack A responds to that signal by sending the corresponding information to the electrical equipment P. Here, since the communication lines are used periodically as described above, there is a set time interval, starting from the end of the previous period of use, where the communication lines are not used. During this interval of nonuse (for example, a set time interval after the control section 5 has sent information), the control section 5 can change the switching device SW from the open state to the dosed state. This outputs the voltage across the temperature detection section 13, which includes the thermistor, to the control section C of the electrical equipment P via the data line, which is a communication line. After the set time interval, the control section 5 puts the switching device SW in the open state.

Finally, in the third embodiment of the present invention, to satisfy various requirements for battery pack A information (for example, battery capacity during charging and discharging), the electrical equipment P sends capacity request signals from the control section C via the communication lines when the information becomes necessary. In response to a capacity request signal, capacity information is obtained from the remaining capacity integration section 4 and sent to the electrical equipment-side from the control section 5 and communication section 11. In this manner, when it becomes necessary, an information request signal is sent from the electrical equipment P to the battery pack A, and the battery pack A responds to that signal by sending the corresponding information to the electrical equipment P. In addition, the control section C of the electrical equipment P sends no new information requests for a given time interval after receiving the previously requested information. After information has been sent to the electrical equipment-side, the communication lines can be assumed unused for the given time interval, and the control section 5 can change the switching device SW from the open state to the closed state. This outputs the voltage across the temperature detection section 13, which includes the thermistor, to the control section C of the electrical equipment P via the data line, which is a communication line. After the given time interval, the control section 5 puts the switching device SW in the open state.

As this invention may be embodied in several forms without departing from the spirit or essential characteristics thereof, the present embodiment is therefore illustrative and not restrictive, since the scope of the invention is defined by the appended claims rather than by the description preceding them, and all changes that fall within the metes and bounds of the claims or equivalence of such metes and bounds thereof are therefore intended to be embraced by the claims. This application is based on Application No. 2005-203,163 filed in Japan on Jul. 12, 2005, the content of which is incorporated hereinto be reference.

What is claimed is:

1. A battery pack comprising:
   a battery;
   communication lines capable of connecting with an electrical device that is attachable to the battery pack;
   a temperature-sensing element that is connected with one of the communication lines and detects temperature of the battery as a voltage;
   a switching device that connects with the temperature-sensing element; and
   a control section connected externally with the switching device to control the switching device;
   positive terminal and a GND terminal; and
   a communication section for processing communications with the electrical device (P), the communication section comprising a communication data generation section for constructing data signals that can be received by the electrical device, a communication driver section for executing actual communication with the electrical device via the communication lines, and a memory for storing data including parameters for computing remaining battery capacity,
   wherein the control section puts the switching device in the open state when the communication lines are being used, and the control section puts the switching device in the closed state to connect the temperature-sensing element with the one communication line so as to output the voltage sensed by the temperature-sensing element to the electrical device via the one communication line when the communication lines are not being used,
   wherein the temperature-sensing element and the switching device are connected in series between one of the communication lines and the GND terminal,
   wherein the switching device is connected between the temperature-sensing element and the GND terminal, and
   wherein the communication lines comprise a data line and a clock line, and the temperature-sensing element is connected to the data line.

2. A battery pack as recited in claim 1 wherein the battery pack is provided with a remaining capacity integration section for computing remaining battery capacity, and remaining capacity computed by that remaining capacity integration section is transmitted to the electrical equipment via the communication lines.

3. A battery pack as recited in claim 1 wherein the battery pack is provided with a control device, which is controlled by the control section, and the control section puts the control device in the cut-off state when abnormal battery current, temperature, or voltage is detected.

4. A battery pack as recited in claim 1, wherein the battery pack has a communication data generation section to construct data signals for transmission of battery information to the electrical device.

5. A battery pack as recited in claim 1, wherein the temperature-sensing element is a thermistor in thermal contact with the battery.

6. A battery pack as recited in claim 1, wherein the battery pack is provided with memory to store ID information, and that ID information, which is stored in memory, is output to the electrical equipment on communication lines when prompted by a request signal from the electrical device.

7. A battery pack as recited in claim 6 wherein the ID information is information that indicates the battery pack manufacturer.

8. A battery pack as recited in claim 1 wherein the control section is operable to receive a request signal from the electrical device, and output an information signal to the electrical device on the communication lines.

9. A battery pack as recited in claim 1, wherein the temperature detection section includes an upper terminal side and a lower terminal side, and the upper terminal side is connected to the data line, and the lower terminal side is connected to the switching device.

10. A battery pack comprising:
    a battery;
    communication lines capable of outputting and receiving information signals to an electrical device when attached to the battery pack;
    a temperature-sensing element that directly connects with at least one of the communication lines and detects temperature of the battery as a voltage;
    a switching device that connects with the temperature-sensing element;
    a control section connected externally with the switching device to control the switching device;
    a positive terminal and a GND terminal; and
    a communication section that is operable to respond to an information request signal sent from the electrical device via the communication lines, the communication section comprising a communication data generation section for constructing data signals that can be received by the electrical device, a communication driver section for executing actual communication with the electrical device via the communication lines, and a memory for storing data including parameters for computing remaining battery capacity, wherein the control section puts the switching device in the open state when the communication lines are being used, and the control section puts the switching device in the closed state to connect the temperature-sensing element with the communication lines so as to output the voltage sensed by the temperature-sensing element to the electrical device via the communication lines when the communication lines are not being used wherein the temperature-sensing element and the switching device are connected in series between one of the communication lines and the GND terminal, wherein the switching device is connected between the temperature-sensing element and the GND terminal, and wherein the communication lines comprise a data line and a clock line, and the temperature-sensing element is connected to the data line.

11. A battery pack as recited in claim 10, wherein the communication lines comprise a data line and a clock line, and the temperature-sensing element is connected to the data line.

12. A battery pack as recited in claim 10, wherein the battery pack is provided with a remaining capacity integration section for computing remaining battery capacity, and remaining capacity computed by that remaining capacity integration section is transmitted to the electrical equipment via the communication lines.

13. A battery pack as recited in claim 10, wherein the battery pack is provided with a control device, which is controlled by the control section, and the control section puts the control device in the cut-off state when abnormal battery current, temperature, or voltage is detected.

14. A battery pack as recited in claim 10, wherein the battery pack has a communication data generation section to construct data signals for transmission of battery information to the electrical equipment.

15. A battery pack comprising:

a battery;

communication lines capable of connecting with an electrical device attachable to the battery pack;

a temperature-sensing element that directly connects with a communication line and detects temperature of the battery as a voltage;

a switching device that connects with the temperature-sensing element;

a control section connected externally with the switching device to control the switching device;

a positive terminal and a GND terminal; and a communication section that periodically receives a request signal from the electrical device, and outputs an information signal to the electrical device on the communication lines, the communication section comprising a communication data generation section for constructing data signals that can be received by the electrical device, a communication driver section for executing actual communication with the electrical device via the communication lines, and a memory for storing data including parameters for computing remaining battery capacity, wherein the control section puts the switching device in the open state when the communication lines are being used, and the control section puts the switching device in the closed state to connect the temperature-sensing element with the communication lines so as to output the voltage sensed by the temperature-sensing element to the electrical device via the communication lines when the communication lines are not being used, wherein the temperature-sensing element and the switching device are connected in series between one of the communication lines and the GND terminal, wherein the switching device is connected between the temperature-sensing element and the GND terminal, and wherein the communication lines comprise a data line and a clock line, and the temperature-sensing element is connected to the data line.

* * * * *